UNITED STATES PATENT OFFICE.

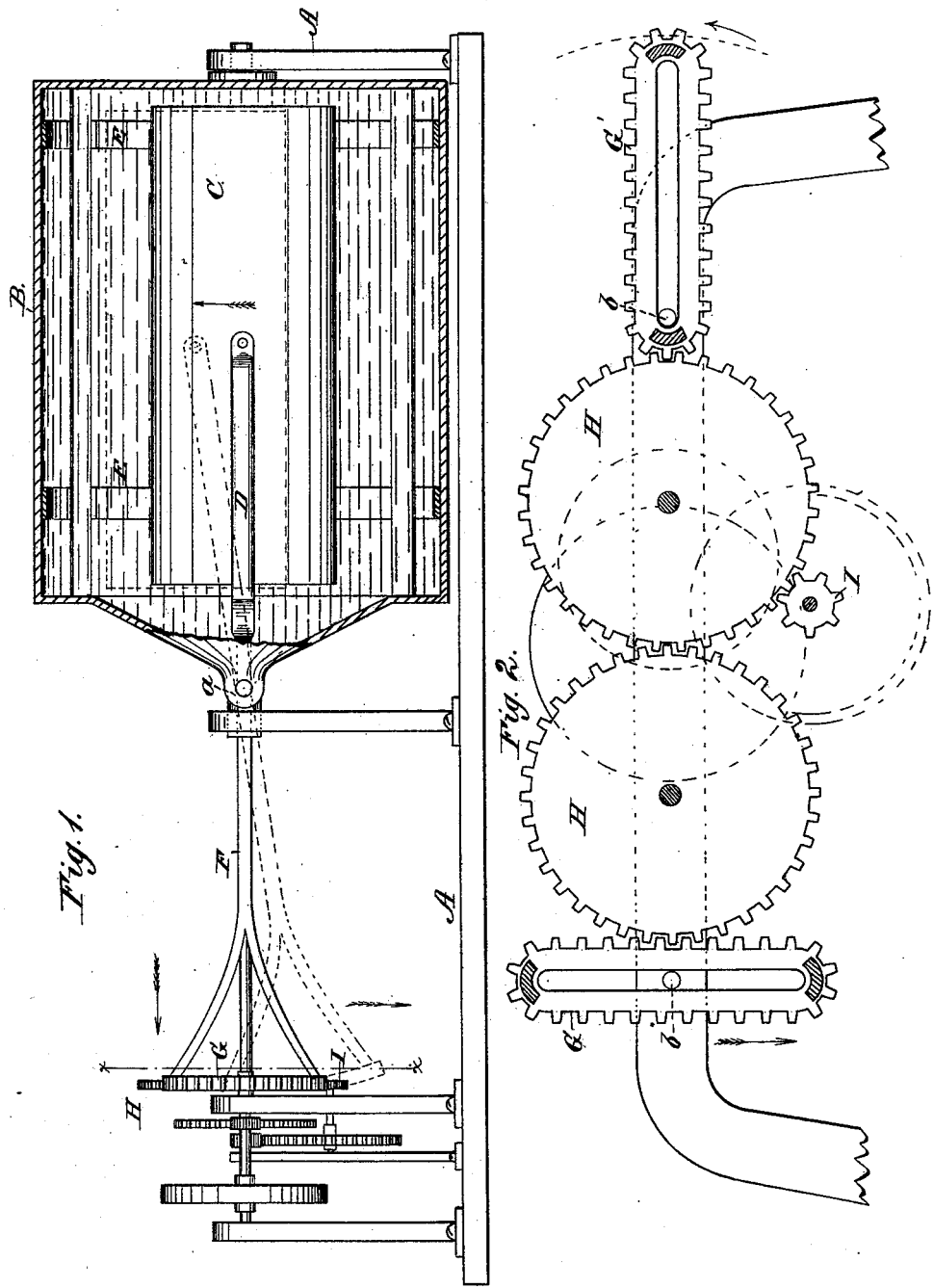

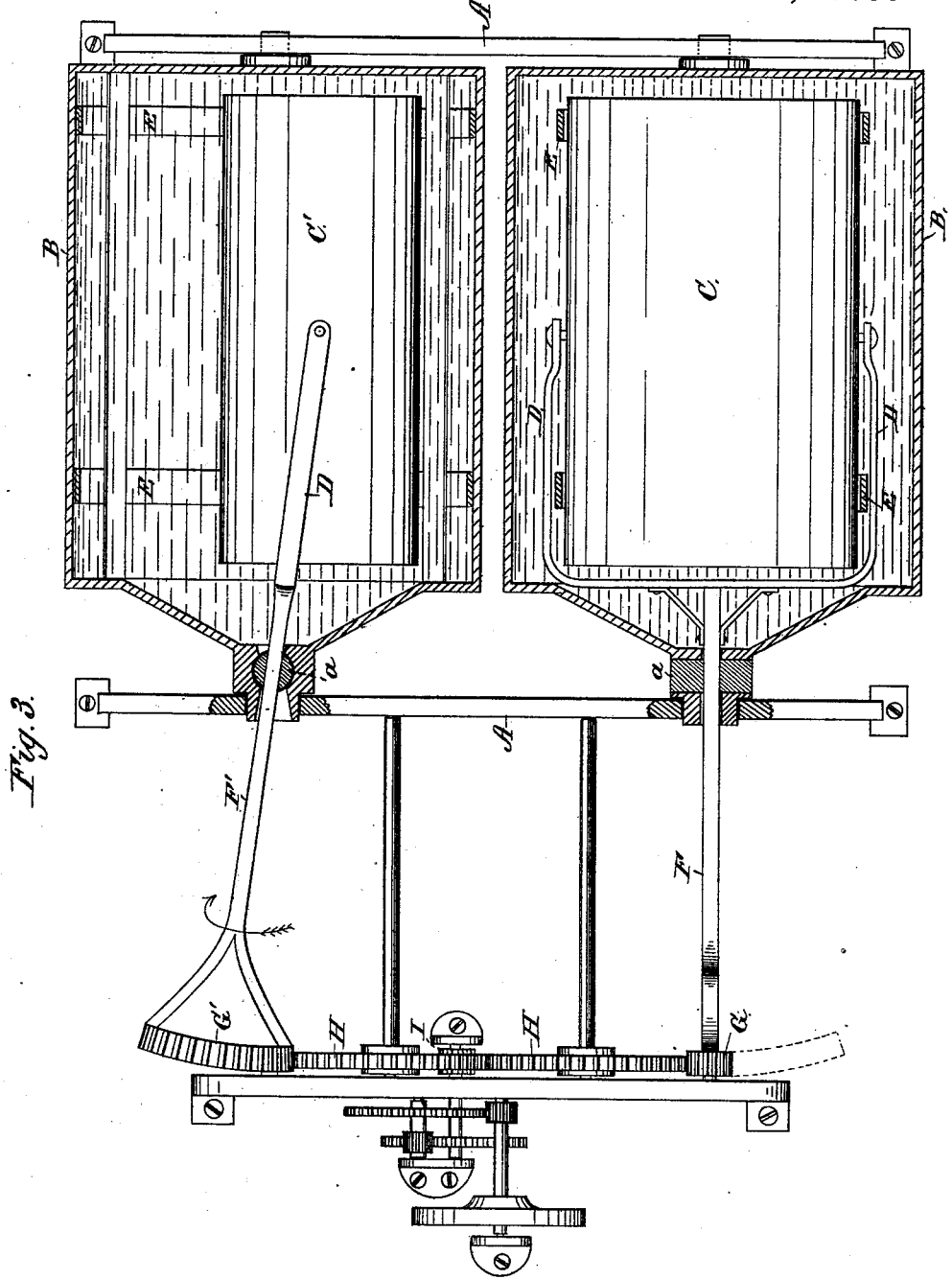

JOHN M. CAYCE, OF THOMPSON'S STATION, TENNESSEE.

IMPROVEMENT IN MOTORS.

Specification forming part of Letters Patent No. 221,779, dated November 18, 1879; application filed September 17, 1879.

*To all whom it may concern:*

Be it known that I, JOHN M. CAYCE, of Thompson's Station, in the county of Williamson and State of Tennessee, have invented a new and Improved Motor; and I do hereby declare that the following is a full, clear, and exact description of the same, reference being had to the accompanying drawings, forming part of this specification, in which—

Figure 1 is a side elevation with the cylinder in section. Fig. 2 is an enlarged detail in section through the line $x\,x$ of Fig. 1, and looking in the direction of the horizontal arrow. Fig. 3 is a plan view with the cylinders in section.

My invention relates to a new motor designed to operate without weights, springs, magnetism, or expansive gas, and which I call the "hydro-buoyant motor," for the reason that it takes advantage of the buoyant value of a float contained in a body of water.

It consists in arranging the float in a receptacle filled with water in such a manner that the float shall be free to rise, and in rising shall communicate its power to extraneous mechanism, the operation being made continuous by reversing the position of the receptacle containing water, which gives a renewed position to the float, from which it may again rise.

I prefer to employ two cylinders provided with such floats, which floats are hung in lever-frames fulcrumed upon a water-tight joint in the end of the cylinder, and which levers are extended outside the cylinder and provided with elongated gears engaging with a plain spur-gear, so that as one float rises its elongated gear descends longitudinally on one of the spur-wheels, acting with its full value thereupon until it reaches the short curve or end of the gear, when the float of the other cylinder acts alternately in a similar manner while the first elongated gear is turning its curve for another vertical descent, all as hereinafter described.

In the drawings, A represents any suitable base, upon which my motor is mounted. B B' are the two cylinders, which are provided with an opening for the introduction and discharge of the water, but are in other respects water-tight. These cylinders are arranged horizontally, and are trunnioned in bearings, so as to revolve upon their longitudinal axes. C C' are the floats, which, as shown, are in the nature of air-chambers pivoted in bifurcated lever-frame D, adapted to vibrate in guide E in the cylinders. These lever-frames are rigidly affixed to a trunnioned fulcrum, $a$, in the ends of the cylinders, which fulcrums are fitted with water-tight joints. Rigidly fixed to the trunnioned fulcrum of each cylinder is a shaft or arm, F F', extending outside of the cylinder as a continuation of the lever-frame, and provided at their ends with elongated gears G G', which consist of parallel racks running into each other at the end in a short curve, and having a straight slot between. These gears mesh with the outer sides of spur-wheels H H, which engage with each other in the middle, and with one of which wheels a pinion, I, meshes, and transmits motion to the fly-wheel.

The operation of the motor is as follows: The cylinders being filled with water and occupying a relation to each other in which one elongated gear is vertical and the other horizontal, the cylinder connected with the vertical gear will be the active or working one, and its float, in rising, causes the outer end of the lever carrying the elongated gear to descend and impart to the train of wheels the buoyant value of the float, or a power representing the difference between the weight of the float and the water displaced thereby. As soon as this float has risen to the top it ceases to act until a renewed position is given to it. To do this the cylinder is to be reversed, and this may be accomplished by having a series of hand-holds on the periphery of the cylinder, which may be grasped to enable it to be turned by hand; or any other suitable power may be employed. To cause both cylinders to act alternately and assist in this reversing process, the two elongated gears are arranged in right-angular position to each other, so that one is vertical and pulling on the driving device, while the other is horizontal and turning the short curve in reversing. When any one of the cylinders is reversed or turned through an arc of one hundred and eighty degrees, it will be seen that the float which, when it it ceased to act, was at the top is now turned by the rotation of the cylinder to the bottom, and it then again commences its independent ascent, and transmits its power in the manner before described. As the elongated gears move about their lever-fulcrums as a center of oscillation, the plane of said gears is a curved one, representing an arc struck from said fulcrum by the lever-arm E as a radius.

As the elongated gears also have a rotary as well as a progressive movement, a pin, $b$, is fixed to the frame-work and rests in the slot of the elongated gear. This pin acts as a journal when resting in the end of the slot and the cylinder is being reversed, and acts as a guide while the elongated gear is descending.

In making use of my invention I do not confine myself to the use of two cylinders, as one may be employed alone. I furthermore do not confine myself to the exact arrangement of parts shown, as they may be modified without departing from the spirit of my invention, which consists, broadly, in a receptacle of any size or shape, made capable of reversal by any means, and combined with a float contained therein, and which float is connected with extraneous mechanism, so as to take advantage of the difference between the specific gravity of the float and that of the water displaced thereby.

This motor is designed to be applied to all uses for which a motor may be employed, and it finds a specially-convenient and effective use in all cases where a light power is required.

Having thus described my invention, what I claim as new is—

1. A motor consisting of a reversible receptacle filled with liquid, a float immersed therein, and mechanism connecting the float with an external gear, whereby the repeated ascents of the float resulting from the reversal of the receptacle are made available as a motive power, as described.

2. A motor consisting of a reversible receptacle containing a liquid, a float immersed therein, and a lever-frame connected to the float and extending outside of the liquid-receptacle, and connected with mechanism adapted to utilize the difference in the specific gravities of the float and the liquid displaced thereby, all combined substantially as described.

3. The combination, with the reversible receptacle, of the lever-frame connected with a float inside of the cylinder and carrying at its opposite end an elongated slotted gear, together with a spur-gear meshing therewith, substantially as described.

4. The combination of the two rotary cylinders B B′, the lever-frames D D′ F F′, the floats C C′, the elongated gears G G′, arranged for alternate action, and a connecting spur-gear, substantially as described.

JOHN M. CAYCE.

Witnesses:
SOLON C. KEMON,
EDWD. W. BYRN.